United States Patent [19]
Allison

[11] Patent Number: 5,804,105
[45] Date of Patent: Sep. 8, 1998

[54] DEVICE FOR DIFFUSING A FIRST FLUID INTO A SECOND FLUID

[76] Inventor: William Allison, 54 River View Tarleton, Preston, Lancashire PR4 6BQ, England

[21] Appl. No.: 624,448
[22] PCT Filed: Oct. 7, 1994
[86] PCT No.: PCT/GB94/02195
 § 371 Date: Apr. 5, 1996
 § 102(e) Date: Apr. 5, 1996
[87] PCT Pub. No.: WO95/09819
 PCT Pub. Date: Apr. 13, 1995

[30] Foreign Application Priority Data

Oct. 7, 1993 [GB] United Kingdom ............... 9320698

[51] Int. Cl.⁶ .................................................. B01F 3/04
[52] U.S. Cl. ..................................... 261/122.2; 264/257
[58] Field of Search ................. 261/122.2; 264/DIG. 48, 264/257

[56] References Cited

U.S. PATENT DOCUMENTS

| | | | |
|---|---|---|---|
| 1,759,983 | 5/1930 | Houston | 261/122.2 |
| 3,186,644 | 6/1965 | Ross et al. | 261/122.2 |
| 3,466,210 | 9/1969 | Waveham | 264/257 |
| 3,594,262 | 7/1971 | Magidson | 264/257 |
| 3,734,812 | 5/1973 | Yazawa | 264/257 |
| 4,581,137 | 4/1986 | Edwards | 261/122.2 |
| 4,624,781 | 11/1986 | Messner | 261/122.2 |
| 4,849,139 | 7/1989 | Jager | 261/122.2 |
| 5,000,884 | 3/1991 | Bassfeld | 261/122.2 |

FOREIGN PATENT DOCUMENTS

| | | |
|---|---|---|
| A-0249014 | 12/1987 | European Pat. Off. . |
| U87 14 502 | 1/1988 | Germany . |
| C38 34 317 | 1/1990 | Germany . |
| 712170 | 7/1954 | United Kingdom ................ 261/122.2 |

Primary Examiner—Tim R. Miles
Attorney, Agent, or Firm—Adams Law Firm, P.A.

[57] ABSTRACT

A fluid diffuser includes an inner extruded tube and an outer extruded tube between which there is a woven fabric material tube. The diffuser includes pores formed by a non-ablative piercing process and being arranged to act as valves which are self-closing when fluid is not flowing through the diffuser. The woven fabric material is arranged to restrain diametral expansion of the inner and outer tubes and thereby restrain an increase in pore size as the pressure of fluid flowing through pores is increased. Thus, if the diffuser is used for diffusing air into water, the size of bubbles produced remains substantially constant as the pressure of air supplied to the diffuser is increased. Other diffusers are described which function in a similar manner, including a disc diffuser and tubular diffusers which are made of sheet material.

15 Claims, 5 Drawing Sheets

DEVICE FOR DIFFUSING A FIRST FLUID INTO A SECOND FLUID

This application is a 371 of PCT/GB94/02195, Oct. 7, 1994.

This invention relates to a fluid diffuser, for diffusing a first fluid into a second fluid, for example for delivering air or another liquid or gaseous fluid in finely divided form to a surrounding medium.

A common use of a fluid diffuser is in the aeration of polluted mediums, for example sewage or polluted lakes or waterways. In each case, air bubbles are passed through the diffuser into a medium to be treated. Oxygen in the air bubbles then dissolves in the medium, whereupon it is taken up by aerobic bacteria that digest polluting organic matter and thereby clarify the medium.

It is well known that the smaller the air bubble size, the faster it dissolves its oxygen in the medium to be treated. Ideally, the air bubble size should not exceed 1 mm in diameter and should preferably be of the order of 50 to 100 $\mu$m in diameter. Such air bubbles can be generated using very fine ceramic diffusers, for example in the form of ceramic tubes having a nominal pore size of 3 to 10 $\mu$m. However, disadvantageously, such ceramic tubes are brittle, expensive, can only be produced in short lengths and require a high internal air pressure to function. Furthermore, the pores of the tubes remain permanently open and will allow back leakage of effluent, if the internal air pressure is removed.

International application number PCT/GB 93/01196 describes a fluid diffuser which comprises an elongate flexible member having opposed walls defining a fluid delivery tube. The walls include a multiplicity of minutes valves formed by non-ablative perforation of the material of the flexible member. The valves are arranged to seal tight (and thereby prevent back-leakage of effluent), when the air pressure within the tube is below a threshold pressure. At the threshold pressure, the valves are arranged to emit tiny air bubbles into the medium surrounding the tube.

The material of the walls of the tube of the aforementioned fluid diffuser must have some resilience so that the valves can be self-sealing. This may lead to a problem in that, as air pressure within the tube increases, the tube extends radially outwardly and valve dilation increases. The increased valve dilation leads to the emission of the larger air bubbles which are less efficient at oxygen transfer than small bubbles.

It is an object of the present invention to provide a fluid diffuser which may alleviate problems associated with known diffusers.

According to a first aspect of the present invention, there is provided a device for diffusing a first fluid into a second fluid, the device comprising:

a porous member which includes pores arranged to be self-closing when a fluid is not flowing therethrough; and restraining means arranged to cooperate with said porous member thereby to restrain an increase in pore size as the pressure of fluid flowing through said pores is increased.

In the context of this specification the term "diffuser" (or like term) includes any device for passing a first fluid into a second fluid.

Thus, if, for example, the device is used for diffusing air into a liquid, increasing the air pressure within the device may advantageously not affect, to any significant degree, the pore size or the emitted air bubble size. The device may function in a manner similar to ceramic diffusers whilst obviating problems associated therewith.

The restraining means is preferably arranged so as to restrain lateral expansion of the pores of the porous member. Preferably, an area of the porous member around each pore is covered by said restraining means. Preferably, said restraining means covers substantially the entirety of said porous member. Preferably, each of a multiplicity of said pores is restrained by a respective part of said restraining means. Preferably, each of a multiplicity of said pores is individually restrained by said restraining means. Preferably, each of said multiplicity of pores is restrained to substantially the same extent; that is, said restraining means is preferably arranged to exert a restraining force of substantially the same magnitude on each pore.

Said porous member is preferably a component of a composite member. Said composite member preferably includes said restraining means. In this case, said restraining means preferably includes means arranged to define openings which openings are arranged to co-operate in use with said pores of the porous member for allowing the flow of fluid through the composite member. In some embodiments, the openings of said restraining means are arranged to be aligned with pores in said porous member. In other embodiments, the openings and pores may be non-aligned. In some embodiments, walls which define said openings of said restraining member may be arranged circumferentially around the pores for restraining lateral expansion of the pores beyond a predetermined limited.

Said composite member preferably comprises a plurality of layers of material. Said composite member preferably comprises a first layer of material and a second layer of material. Said first layer is preferably comprised by said porous member. Said second layer is preferably comprised by said restraining means. Said first and second layers are preferably juxtaposed. Said first and second layers are preferably in intimate contact. Said first and second layers may be bonded to one another. Said layers may be bonded together by the action of heat. Said composite member may comprise solely said first layer and second layer as described above. Said composite member is preferably elongate.

The material of said first layer is preferably resilient. Said material of said first layer is preferably substantially incompressible. Said material of said first layer is preferably flowable. The material of said first layer is preferably flexible. The material of said first layer is preferably a synthetic material. The material of said first layer is preferably not negatively buoyant. The material of said first layer is preferably a polymeric material. Preferred materials include heat-sealable synthetic plastics materials, for example polyvinyl chloride, polyethylene and ethylene vinyl acetate and bondable materials such as silicone rubbers and polyurethane rubbers.

The material of said second layer is preferably relatively inelastic. The material of said second layer is preferably flexible. The material of said second layer is preferably a synthetic material. The material of said second layer is preferably a polymeric material. The material of said second layer is preferably not negatively buoyant. The material of said second layer may be one of the preferred materials described for the first layer. In some embodiments, the material of said second layer includes parts which extend in a first direction and parts which extend in a second direction, said first and second directions preferably being perpendicular. Preferably, said parts are comprised by warp and weft strands of a woven fabric material. In this event, the material of said second layer is a woven fabric material.

Where the first and second layers are bonded to one another and where the material of the second layer is a woven fabric material, openings defined between warp and weft strands of the fabric material are preferably aligned with pores defined in said first layer. Preferably, parts of the first layer are disposed between the openings defined between said warp and weft strands. For example, material of said first layer may flow into openings defined between said warp and weft strands during the process of bonding the first and second layers to one another.

The device of said first aspect may be in the form of a flat plate. Preferably, said device is in the form of a perforated fluid delivery tube. In this case, the device preferably includes said composite member described above. Opposed walls of the composite member may define said perforated fluid delivery tube. In a preferred embodiment, a negative buoyancy aid is associated with said fluid delivery tube. Said negative buoyancy and said restraining means are preferably separate elements of said device. Said negative buoyancy aid may be held captive by said opposed walls in spaced relationship with said tube. Alternatively and/or additionally, said negative buoyancy aid may be suspended beneath the tube.

Preferably, the perforated fluid delivery tube is arranged to have a circular cross-section when a fluid is flowing therein. The perforated fluid delivery tube may be arranged to collapse, suitably into a substantially flat state, when a fluid is not flowing therein. Preferably, the fluid delivery tube is in a relaxed state when collapsed.

In one embodiment, said composite member is in the form of a flexible material strip. In this case, preferably, said opposed walls of said composite member are made of the same material. Preferably, the opposed walls are of the same thickness. Preferably, each of said opposed walls is of perforate construction. Thus, preferably, opposing parts of said fluid delivery tube are perforated. The opposed walls of the fluid delivery tube may be made from a single sheet of material and/or may be made from a flattened tube. Preferably, the opposed walls are made from separate sheets of said aforementioned composite member. Preferably, inwardly facing surfaces of said separate sheets are joined to one another, for example, by heat-sealing, in order to define said perforated fluid delivery tube. Preferably, said separate sheets are perforated to form longitudinal zones of perforations at corresponding locations before being joined at opposite sides of said zones to form said tube.

Where the device includes a negative buoyancy aid, said negative buoyancy aid is preferably held captive between two opposing portions of said composite member. When the composite member is elongate, said negative buoyancy aid is preferably elongate and is held captive between elongate portions of said composite member. Said elongate portions are preferably defined by portions of said composite member which are joined to one another, for example, by heat-sealing. When said composite member is made from separate sheets of material, preferably inwardly facing surfaces of separate sheets are joined to one another in order to define said elongate portions.

Said negative buoyancy aid is preferably held captive by said walls along substantially the whole extent of the composite member. Said negative buoyancy aid is preferably enclosed, suitably along substantially its whole extent, by said composite member.

The device may include buoyancy adjustment means for altering the buoyancy thereof. Said buoyancy adjustment means may be provided if it may be desirable to vary the submerged depth of the device. Said buoyancy adjustment means may comprise a further, unperforated tube which is inflatable to a variable extent so as to alter the buoyancy of the device. Opposed walls of said composite member preferably define the walls of the unperforated tube.

The provision of a buoyancy adjustment means as described may be particularly useful in the case of a submergible boom as described in U.K. Patent Application No. 9116072 (relating to a submergible boom for controlling oil spillages) because the boom may be positioned at any required depth depending upon the weather conditions or it may be positioned at a suitable depth below an oil spillage.

In another embodiment, said composite member may comprise at least two extruded, suitably circular cross-section and seamless, tubes, one being arranged within the other. A woven fabric material of the type described above may be arranged between said tubes. Preferably, each of said tubes includes openings for passage of fluid. An outer part of the composite member is preferably arranged to resist diametral expansion of an inner tube of the member.

The device of the first aspect preferably further includes tethering means for tethering the device in position in use. Where the negative buoyancy aid is in the form of a metal filament, said metal filament may extend beyond the ends of the fluid delivery tube and be equipped with end fittings for tethering the device in a position of use.

The device preferably includes means for removably securing a fluid delivery line.

The device described above is suitably at least 0.5 metres in length. Preferably, the device is at least 1 metre in length. The device may be greater than 5 or 10 metres in length.

The device is preferably sufficiently flexible such that is may be stores in a rolled up state; for example, it may be stored on a reel in the manner of a hose.

According to a second aspect of the present invention, there is provided a method of diffusing a fluid into a surrounding medium for example air into sewage, the method comprising placing a device according to the first aspect into said medium and introducing the fluid into the device at a pressure such that the fluid is forced through the pores of the porous member into the surrounding medium.

According to a third aspect of the present invention, there is provided the use of a device according to a first aspect for diffusing a fluid into a surrounding medium.

According to another aspect, there is provided a method of manufacturing a device according to the first aspect, the method comprising arranging a porous member having pores arranged to be self-closing when a fluid is not flowing therethrough and a restraining means such that the restraining means co-operates with said porous member to restrain an increase in pore size as the pressure of fluid flowing through the pores is increased.

The method may comprise arranging said restraining means in position so as to cooperate with a non-porous member and perforating said non-porous member using a non-ablative process in order to define said porous member.

Where the device includes a first layer and a second layer bonded to one another and where the material of the second layer is a woven fabric material, said first and second layers are preferably bonded to one another prior to the step of perforating said first layer.

Specific embodiments of the invention will now be described, by way of example, with reference to the accompanying diagrammatic drawings in which.

BRIEF DESCRIPTION OF THE DRAWINGS

Figure 1:
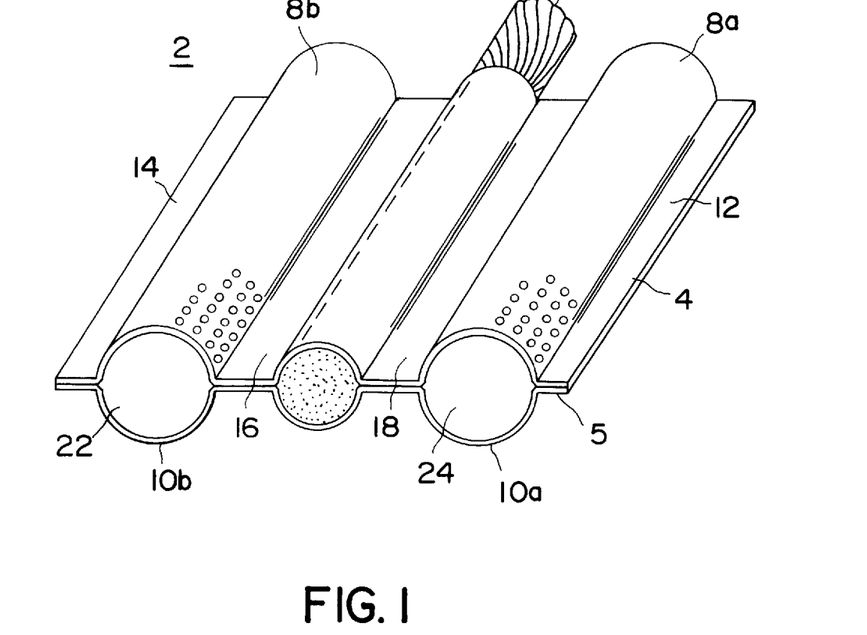
FIG. 1 shows a fluid diffuser in an inflated (fluid delivery) condition.

Referring to FIG. 1, the fluid diffuser 2 comprises an elongate material strip (of which only a short section is shown) made from two separate composite sheets 4, 6 which are separately perforated in two lateral zones 8a, 8b and 10a, 10b and then heat-sealed together at their longitudinal edges 12, 14 and at intermediate positions 16, 18 to either side of a flexible steel cable 20 positioned between the sheets 4, 6. The fluid diffuser 2 thus has opposed walls formed by sheets 4, 6 incorporating fluid delivery tubes 22, 24 with perforations provided by the coinciding perforated zones 8a, 10a and 8b, 10b. The steel cable 20 provides a negative buoyancy aid which is trapped and sealed in position by the heat sealed portions 16, 18.

The fluid diffuser 2 is similar to, and may be manufactured in a similar manner to, diffusers described in co-pending International application number PCT/GB 93/01196 and the contents of said International application are incorporated herein by reference. The fluid diffuser 2 differs from diffusers described in said International application by the provision of composite sheets 4, 6 (described in detail below) instead of plain polymer membranes described in the International application.

Each composite sheet 4, 6 is comprised of a resilient polymer film layer and a woven fabric material layer, the layers being integrally bonded to one another. The material of the polymer film layer may be, for example, plasticised polyvinyl chloride, low or medium density polyethylene, ethylene vinyl acetate, silicone rubber or polyurethane rubber. The woven fabric material may be, for example, woven nylon material.

A composite sheet of material is formed by calendering sheets of the polymer film and woven fabric materials together at an elevated temperature. During the process, the sheets become bonded to one another in such a manner that the polymer film layer is "extruded" into mesh spaces defined between warp and weft strands of the woven fabric material, thereby forming islands of polymer film between the strands of woven fabric. For example, referring to FIG. 2, polymer film layer 26 includes polymer islands 28 which are arranged, in the composite material 30, in spaces defined between warp (or weft) strands 32 of woven fabric material 33.

Figure 2:
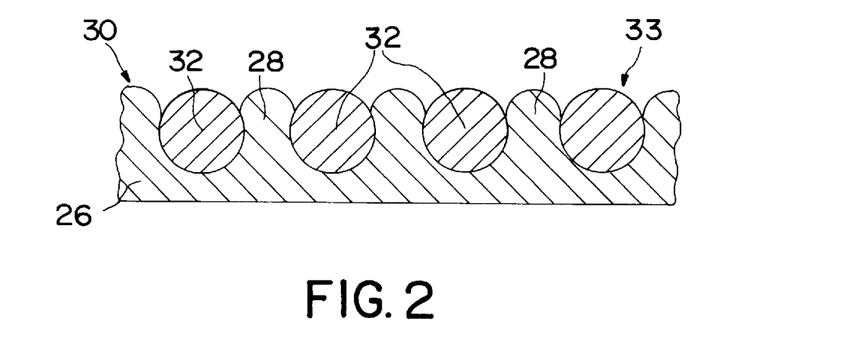
FIG. 2 is a cross-section of a composite material (before piercing) used in the manufacture of the diffuser.

Prior to being formed into a tube, the composite sheet of material 30 is subjected to a non-ablative piercing process. Needle wheels as described in International application number PCT/GB 93/01196 may be used in the process. It has been found that piercing can be made to occur only in the polymer islands 28, leaving the warp and weft strands 32 of the fabric material 33 unaffected. It is believed that, during the piercing process, the needles of the needle wheels push aside any warp or weft strands they encounter and, therefore, only pierce the polymer islands 28. The piercing process results in the formation of extremely small self-sealing vales 31 (FIGS. 3 and 4), each one being contained within its own mesh boundary, defined by weft and warp strands 32.

Tubes 22, 24 of diffuser 2 are then made by bonding pierced composite sheets 4, 6 together as described in International application number PCT/GB 93/01196. The tubes 22, 24 are formed such that the polymer film layer 26 defines the inside wall of the tubes and the woven fabric material layer 33 is on the outside of the tubes.

The tubes 22, 24 function significantly differently compared to those described in PCT/GB 93/01196, due to the provision of the composite sheets 4, 6. It has been found that the woven fabric material layer 33 confers great length and lateral dimensional stability on the tubes 22, 24, so that diametral or circumferential expansion of the tubes is severely restricted. Furthermore, the polymer islands 28 are tightly bound on a miniature scale. The functioning of the tubes 22, 24 is described further below.

When the pressure of air flowing within tubes 22, 24 is below a threshold pressure, all of the self-sealing valves of the tubes are closed and the tubes are effectively gas tight. When there is zero air pressure within the tubes, the self sealing valves of the tube seal down tightly and the tubes collapse state so as to assume a flattened form. In the collapsed state, the greater the pressure on the outside of the flattened tubes, the together the self-sealing valves seal. Thus, the tubes cannot back flood with water.

When air pressure is introduced into flattened tubes 22, 24, the tubes expand until they reach a diametral limit imposed by the circumferential restraint of the strands of the woven fabric material. The fabric material is substantially non-expansible and, therefore, any further expansion of the tubes is severely constrained. Thus, the tubes are essentially diametrically stable (within operational design limits).

Unlike the case with the diffusers of PCT/GB 93/01196, diametral expansion of the tubes can play little or no part in valve dilation; i.e. increasing air pressure in the tubes does not result in valve dilation due to an increase in the diameter of the tubes. The only resilience within the tubes are the islands of polymer in the mesh spaces and even these are constrained by the weft and warp strands that form the mesh boundaries. The only route for air to escape from the tubes is via the self-sealing valves in the mesh boundaries. At a threshold pressure, the valves open minutely and very small bubbles are emitted at a relatively slow rate. Increasing the pressure, within an operating range, causes the rate of bubble emission to increase—in contrast to the case with the diffusers of PCT/GB 93/01196, the bubbles scarcely increase in size as the pressure increases. This virtual stability of bubble size is due to the stable geometry of the tubes and very tight control of valve dilation, due to the constraint imposed by the woven fabric material.

Figure 3:
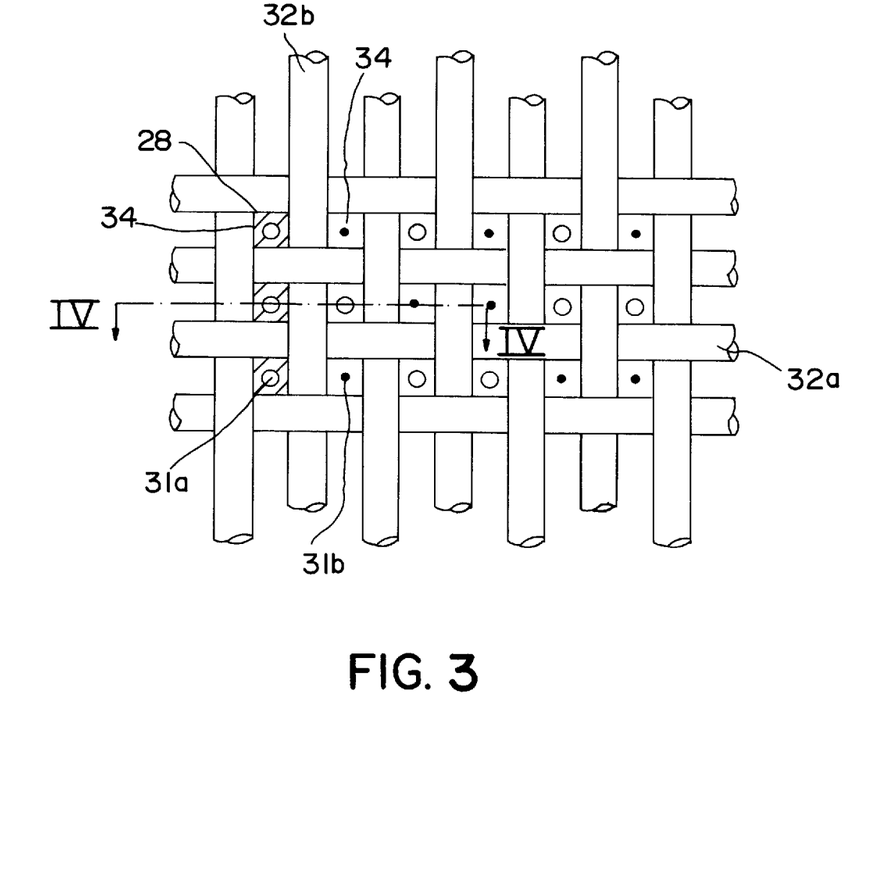
FIG. 3 is a plan view of a wall or a tube of the diffuser, during use.
Figure 4:
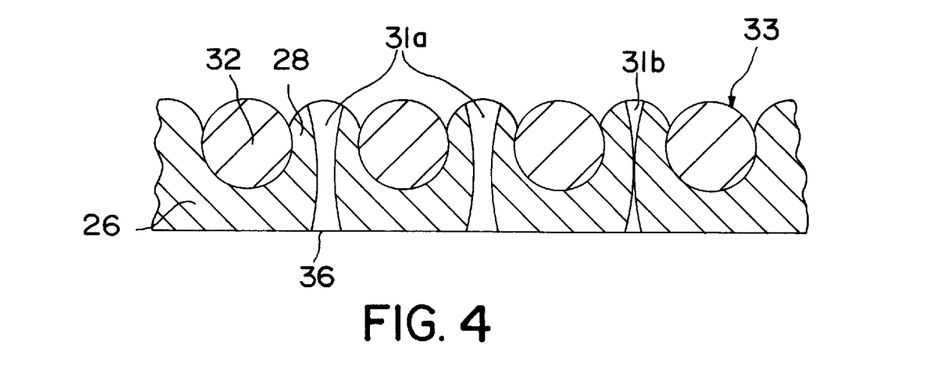
FIG. 4 is a cross-section along line IV—IV of FIG. 3.

FIGS. 3 and 4 illustrate the arrangement and possible functioning of the composite material of the tubes 22, 24. The figures illustrate weft strands 32a and warp strands 32b which define mesh boundaries 34 within which islands 28 of the polymer film layer 26 are disposed. Self-sealing valves 31 are provided within the mesh boundaries 34. The valves 31 are arranged to open (e.g. see valves 31a) and close (e.g. see valves 31b) when subject to a fluid pressure on the polymer film side 36 of the composite material.

The threshold pressure and nominal operating range of the self-sealing valves of the diffuser may be varied, at the design state, to suit particular applications. A typical operating regime may be a threshold pressure of 1 psi and an operating range of 1–4 psi. Furthermore, a diffuser may be constructed so as to produce air bubbles of any desired size and maintain that bubble size, within very close limits, across the operating pressure range of the diffuser. Thus, as operating pressure increases, the only effect is a dramatic increase in the bubble flux (a greater number of bubbles), of almost identically sized bubbles.

The constrained valves of the diffuser 2 produce rather complex dynamics which are believed to be as follows. When in operation, the valves are constantly in motion throughout their depth. Furthermore, each valve is closely adjacent to its neighbour and suitably all valves are identically stressed, at any given operating pressure. When operating, the individual valve action is cyclical; constantly and rhythmically opening and closing. The cycle rate is directly related to the pressure within the tubes of the diffuser. The higher the pressure, the faster the open/close/open cycle. Because of the very close proximity of the individual valves and the resilience of the polymer layer 26, the valves are believed to operate in a synchronous cycle, within closely related groups. This synchronous effect is due to the resilience of the polymer film layer 26.

Figure 5:
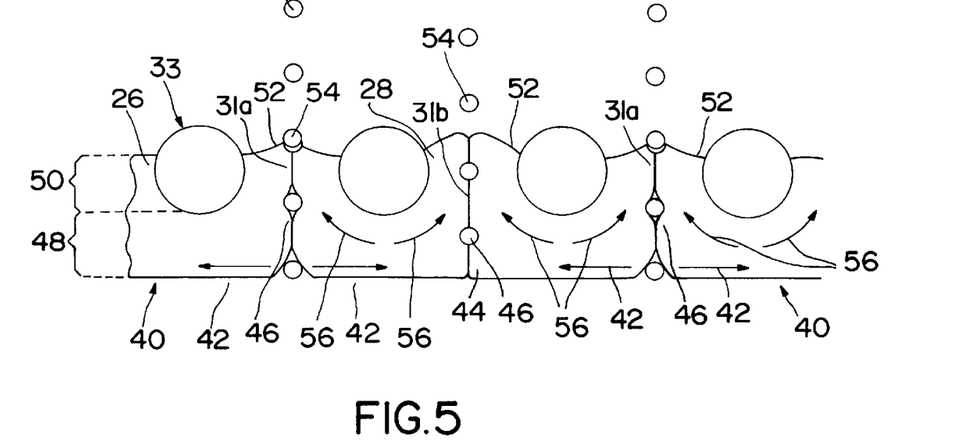
FIG. 5 is a cross-section through a wall of the diffuser showing the detailed dynamics of the diffuser in use.

Referring to FIG. 5, as a valve 31a is forced open by air pressure 40 in the tube, the portion of the polymer layer 26 which defines the wall of the valve 31a is deflected as represented by arrows 42. This deflection stress is partially transmitted to neighbouring valves in the "group" (for example, valve 31b), thereby "pinching" them tighter (for example as shown at position 44). The resilience of the material of the polymer layer 26 causes initially open valve 31a to rebound or "snap back" against the stress and it closes down trapping a minute air pocket 46 within it. This relief of stress in the valve 31a removes the "pinch" on its near neighbour 31b and allows that valve to move through the same cycle. Thus, within the resilient polymer layer 26, rhythmical stress reversals cause synchronous, group valve cycling.

At any given pressure (within the operating range), all valves 31 operate at the same rate, i.e. the same open/close/open cycle time. Increasing the pressure causes faster cycling; conversely, decreasing the pressure causes slower cycling. Because of the rebound or "snap back" of the valves 31, the minute pockets of air 46 enclosed by the valves are subject to increased pressure as they migrate along the length of the valves. In effect, the valves act like peristaltic pumps, squeezing minute air parcels 46 along their length.

As an air parcel 46 passes along the length of a valve 31, it moves out of a pure polymer substrate zone 48 of the polymer layer 26 and into a zone 50 where the polymer is surrounded and constrained by the fabric material 23, i.e. into the polymer islands or upswells 28 described above. In the zone 50, circumferential or diametric expansion of the valve is severely limited, by virtue of the constraint by the weft and warp strands 32 of the fabric material 33 and, in view of this, the migrating air parcel 46 is subject to even greater pressure than when in zone 48. The only real freedom of movement for the polymer island 28 is upwards, i.e. perpendicular to the extent of the weft and warp strands. Consequently, each outer surface 52 (the top surfaces of the islands 28) rises and falls rhythmically, as each air bubble 54 is expelled. The forces evolved during the rise and fall of the outer surfaces 52 are transmitted, from top to bottom, back along the length of the portions of the polymer layer 26 which define the valves. Thus, in a rhythmical cycle, each valve extends and contracts along its length, whilst dilating and contracting (in variable degrees) diametrically. At no point in this complex cycle is a valve fully open. At any instant in the cycle, a valve is only open, at a point along its length, where it surrounds an entrapped air parcel 46.

The air parcels 46 are minute and, as shown in FIG. 5, several independent parcels may be separately entrained, in a moving stack, throughout the length of a valve. The greater the thickness of the polymer layer 26 and fabric material 33, the greater the number of air parcels in a stack. It must be stressed, that each air parcel is entrained in its own separate enclosure, within the valve length. Each separate parcel of air 26 will be ejected as an individual air bubble 54, as it emerges from a valve 31 into the surrounding medium.

The woven fabric material 33 plays no part in the dynamics of the diffuser 2, but the severe restraints it provides greatly influences motion of the valves 31 and the overall efficiency of the diffuser. The polymer layer 26 is the dynamic component of the diffuser. Like water, the polymer of the film layer 26 can flow (though in a much more restrained manner); but just like water, its volume cannot be reduced, i.e. it is incompressible. The woven fabric material 33 severely restricts the flow of the polymer of the film layer 26 and thus tightly controls valve action in the operating mode. Arrows 56 in FIG. 5 represent the direction of constrained flow of the polymer of the film layer 26. The principle also works to great advantage in reverse.

The woven fabric material 33 also has an effect should a net external pressure be applied to the diffuser. In this case, each tube simply collapses flat (layflat form) and the valves 31 shut down. The wove fabric material severely restricts the spread of the layflat form and the polymer layer 26 is thereby tightly constrained. Additionally, the two inner faces of the layflat tube are forced together by the external pressure, thereby sealing the valves to an even greater extent.

The diffuser 2 may be made in long lengths, for example of up to several hundred metres, and, in view of its inherent flexibility, it may be coiled onto a reel for storage purposes. The diffuser may be applied to and removed from already flooded situations, for example to rivers, canals, lagoons and sewage tanks in a simple manner. The fluid tubes of the diffuser may be constructed with any desired bore size, for example from 2 mm to greater than 500 mm. A diffuser may be constructed so as to produce bubbles of any desired size, for example of the order of 1 $\mu$m to 5 mm. In this latter case, the diffuser may be used to produce a bubble curtain for entrapping oil slicks at sea as described in U.K. Patent Application number 9116072 (relating to a submergible boom for controlling oil spillages) or for deflecting particles in effluent streams. When used to produce a bubble curtain, the woven fabric material suitably has a large mesh size, thereby affording less restriction to valve dilation. The valves may also be larger and wider spaced in their groupings. The wider the valve spacing, so the less the synchronous effect of valve grouping. Well spaced valves will cycle in a random fashion, i.e. they will not interact with their neighbours.

As will be appreciated from the above description, the provision of the woven fabric material allows relatively thin walled diffusers to be constructed which are operable at relative high pressures to produce small bubbles. Diffusers can be designed with operational pressure ranges of, for example 1 to 4 psi or 20 to 24 psi, wherein throughout the operation pressure ranges, bubble size is virtually stable. Furthermore, in view of the dimensional stability of the diffusers, the diffusers generally cannot be "stretched open" in use, for example by hydraulic forces often encountered in flowing rivers or in sewage tanks. Also, advantageously, the composite material described above which may be used to form the diffusers is highly resistant to tearing and damage by abrasion.

Figure 6:
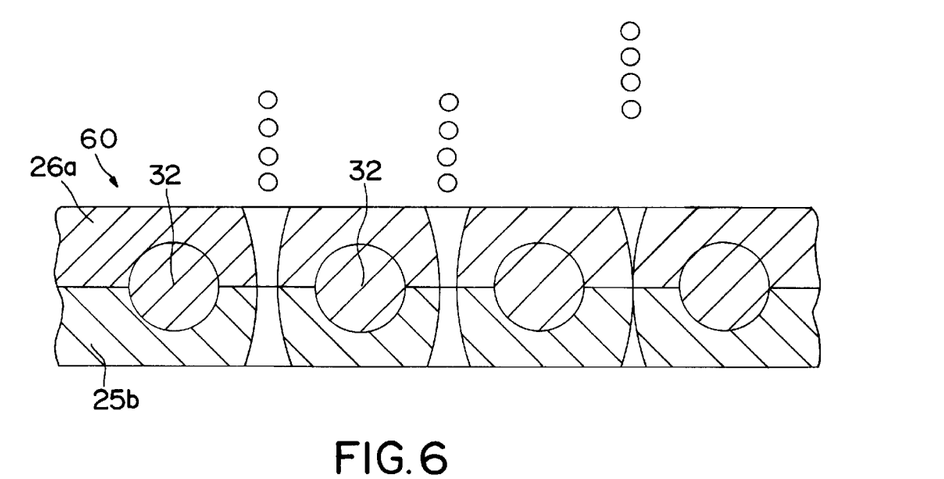
FIG. 6 is a cross-section of an alternative composite material used in the manufacture of a diffuser.

A further example of composite sheet material which may be used in the formation of a fluid diffuser is shown in FIG. 6. Referring to that figure, composite sheet material 60 includes warp and weft strands 32 as described with reference to the other embodiments. However, in the embodiment, the strands 32 are sandwiched between, and integrally bonded to, two polymer film layers 26a and 26b. There may be advantages, in some cases, with the arrangement of FIG. 6, since the action of valves formed in the composite sheet material 60 may not be fully independent— the valves may act in a manner which is, to some extent, asynchronous.

Figure 7:
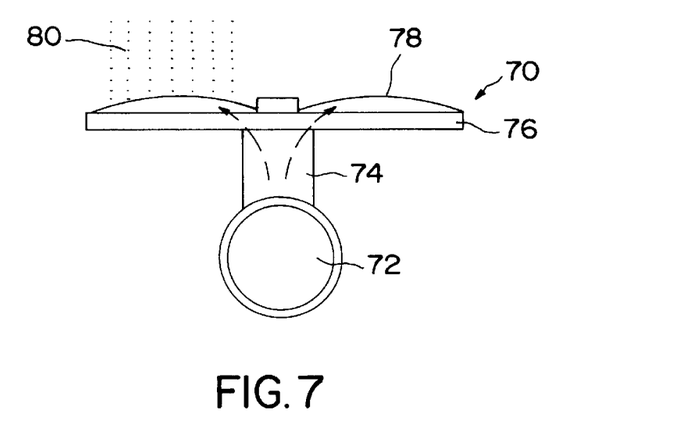
FIG. 7 is a cross-section through a disc diffuser, in use.

Instead of using the composite sheet materials 4, 6, 60, described herein to manufacture tubular diffusers, the composite material may be used to manufacture a flat plate or disc diffuser. For example, referring to FIG. 7, a disc diffuser 70 includes a fluid supply pipe 72 which communicates with a transversely extending branch pipe 74. A disc-shaped plate 76 supports a disc shaped diffuser membrane 78 made of composite material as described above. The diffuser 70 is arranged for the passage of air bubbles 80 into a surrounding medium via diffuser membrane 78. The fabric material layer of the composite material ensures that the diffuser membrane 78 remains generally flat in use and that the diffuser delivers small bubbles of a generally constant size as the pressure of fluid in supply pipe 72 is increased.

The embodiments described above utilise sheet materials. Advantageous diffusers may also be made that use other materials, as shown in FIGS. 8 to 13 and described further below.

Figure 8:
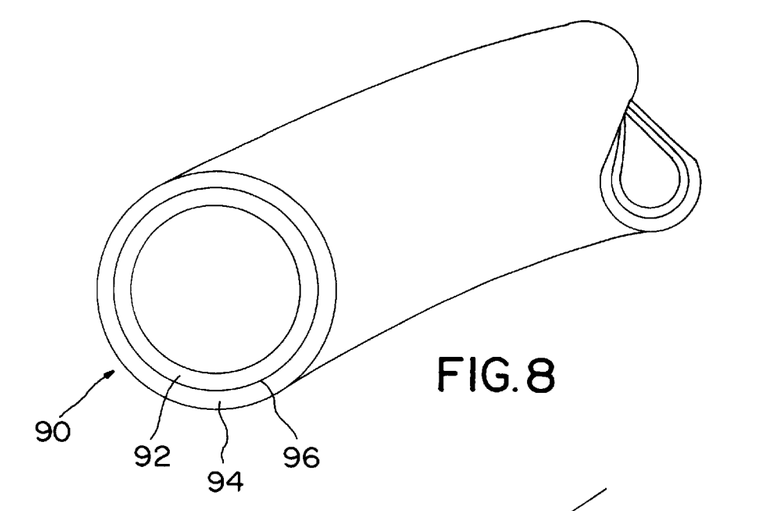
FIG. 8 is a perspective view of part of a diffuser comprising extruded tubes.
Figure 9:
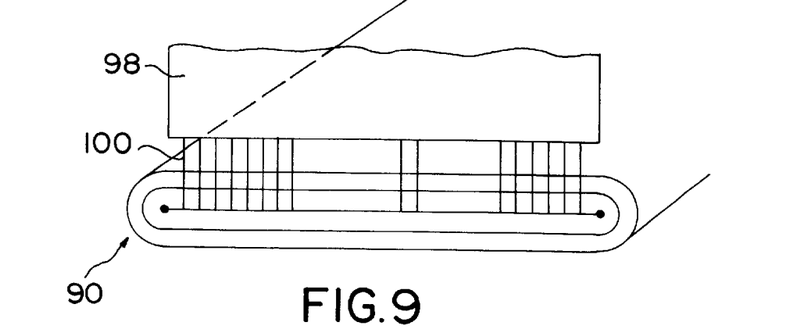
FIG. 9 shows, schematically, a method of piercing the tube of FIG. 8.
Figure 10:
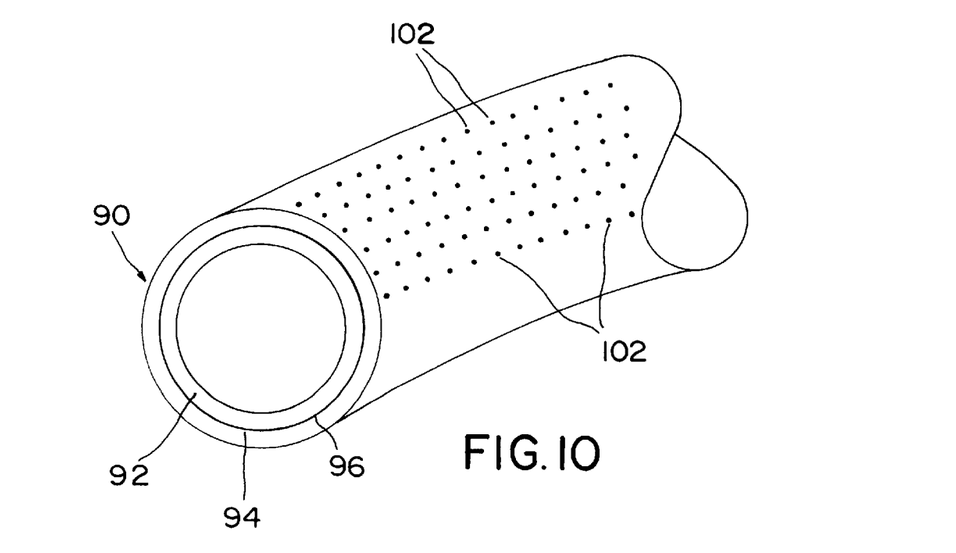
FIG. 10 is a perspective view of the tube of FIG. 8, after piercing.

Referring to FIGS. 8 to 10, the diffuser 90 includes an inner extruded tube 92 and an outer extruded tube 94 between which is a woven fabric material tube 96 of the type described above.

The diffuser 90 may simply be made in an extrusion process by extruding respective material to form tubes 92 and 94 on the inside and outside of the fabric material tube 96. During this process the tubes 92 and 94 become intimately bonded to the fabric material tube 96. Then, the arrangement may be flattened and non-ablatively pierced using a needle wheel 98 which includes needles 100, as shown in FIG. 9. After piercing, the diffuser 90 assumes a tubular state and includes a multiplicity of self-closing valves 102 as shown in FIG. 10.

The diffuser 90 may suitably have a 25 mm centre bore and the wall thickness of inner and outer tubes 92, 94 may be in the range 1 mm to 2 mm. The tubes 92, 94 may be made from silicone rubber, polyurethane or elastomeric grades of PVC or EVA. Suitably, the material used can be stretched at least 30% (and preferably up to 100%) within its elastic limit. Additionally, the material may have a Shore A Hardness in the range 50 to 80. The fabric material tube 96 may be made of nylon or polypropylene.

The diffuser 90 functions in a similar manner to the embodiments described above in that the woven fabric material tube 96 substantially prevents any diametral expansion of the tube when air pressure within the tube is increased. Thus, as air pressure is increased, the bubbles produced remain of a substantially constant size. The main difference between the diffuser 90 and the embodiments described above is that the diffuser does not normally collapse flat under an external net pressure.

Figure 11:
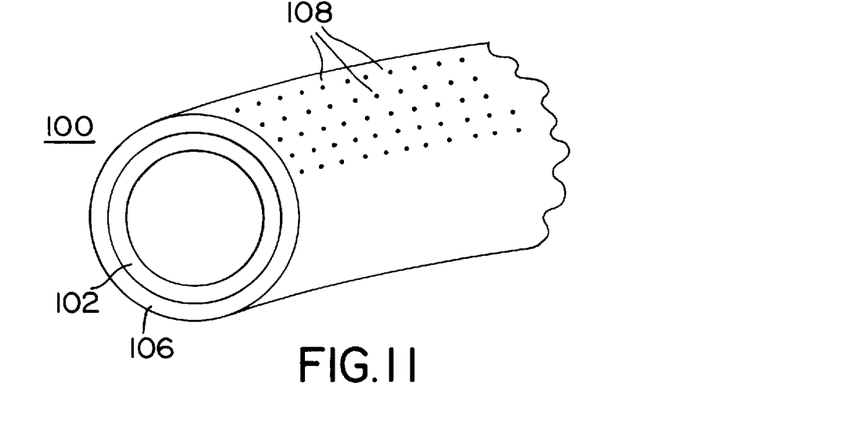
FIG. 11 is a perspective view of part of an alternative diffuser comprising extruded tube.
Figure 12:
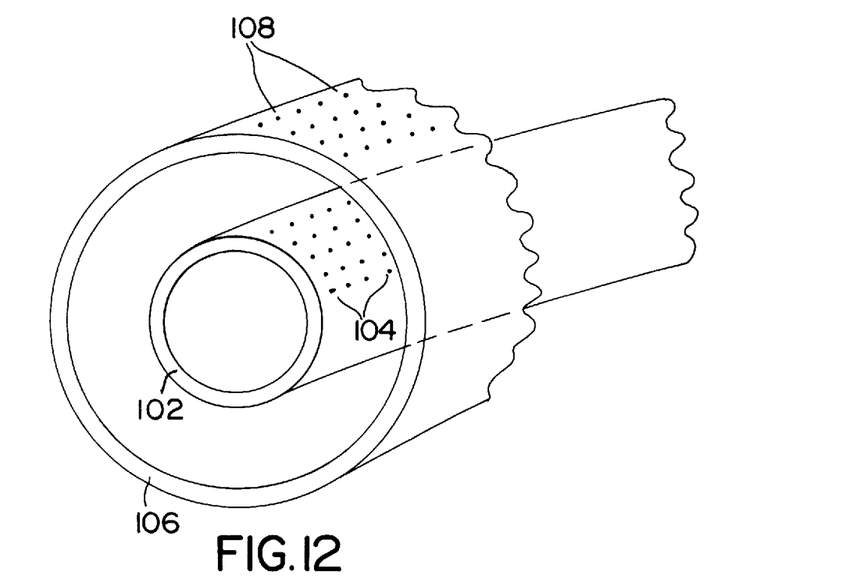
FIG. 12 shows the diffuser of FIG. 11 during manufacture.

Referring to FIGS. 11 and 12, the diffuser 100 includes an inner flexible extruded tube 102 which includes perforations 104 arranged to define self-closing valves and an outer flexible extruded tube 106 which includes perforations 108 also arranged to define self-closing valves.

The outer tube 106, at least, is made of a heat-shrinkable material, for example of silicone rubber or elastomeric grades of PVC or EVA. The inner tube 102 may be made of a material which is not heat shrinkable or is less heat shrinkable than the material of the outer tube. The outer and inner tubes may be made of the same type or of different types of material. Where the material used is silicone rubber, the Shore A Hardness may suitably be in the range of 50 to 80 and the material may stretch between 100% to 200% within its elastic limit.

The diffuser 100 may be manufactured as follows. Firstly, each of the extruded tubes 102 and 104 is separately pierced as described above with reference to FIG. 9. Then, the pierced tubes are arranged as shown in FIG. 12 with the inner tube being arranged within the outer tube. The arrangement may be achieved by sliding the outer tube along the inner tube. When in this stretched condition, the outer tube is highly stressed. The outer tube is then heated using, for example a hot air gun or tubular heating oven, such that the outer tube shrinks tightly onto the inner tube, but not sufficient to collapse the inner tube. In this event, the outer tube remains partially stressed because it cannot regain its relaxed state, but the perforations in the tube have shrunk dramatically during the heat shrinking.

Figure 13:
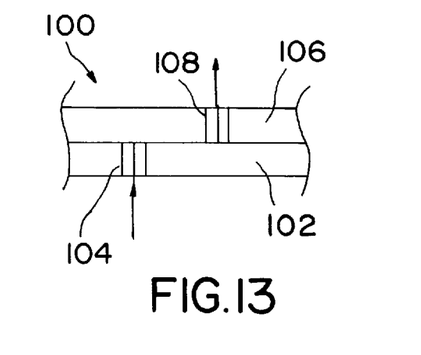
FIG. 13 shows, schematically, the diffuser of FIGS. 11 and 12 in use.

In use, when air is introduced into the unstressed inner tube 102, its expansion is greatly restrained by the outer stressed tube 106. As shown in FIG. 13, parcels (bubbles) travel up restrained pores 104 in the inner tube 102, turn at right angles and travel between the interface of the two tubes 102, 106 until they reach the nearest pore 108 in the outer tube 106. During travel along the interface, the air parcels may be broken up into even smaller parcels, because of the relative high closure pressure across the interface.

The bubble size using a diffuser of the type described can be predetermined by adjusting one or more of the following parameters:

i) needle size used to form pores 104, 108;

ii) needle point depth;

iii) thickness of the tube walls;

iv) hardness (Shore A) of the tubes;

v) heat shrink ratio of the outer tube. This may be from 4 to 1–1.5 to 1.

For each of parameters i) to iv), the values described may be the same or different for the respective tubes 104, 108.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A device for diffusing a first fluid into a second fluid, comprising:
   (a) a tubular member which includes pores for passage of fluid from inside the tubular member to the outside, said pores being arranged to be self-closing when a fluid is not flowing therethrough, said tubular member including a restraining layer; and
   (b) an inner layer arranged inwardly of said restraining layer and an outer layer arranged outwardly of said restraining layer, wherein said restraining layer cooperates with said inner layer and said outer layer for restraining an increase in pore size as the pressure of fluid flowing to the outside through the pores of said member is increased.

2. A device according to claim 1, wherein said restraining layer is arranged so as to restrain lateral expansion of the pores of the tubular member.

3. A device according to claim 1, wherein an area of the porous member around each pore is covered by said restraining layer.

4. A device according to claim 1, wherein said restraining layer covers substantially the entirety of said inner layer.

5. A device according to claim 1, wherein each of said pores of said tubular member is restrained to substantially the same extent.

6. A device according to claim 1, wherein said first layer is in intimate contact with said restraining layer.

7. A device according to claim 1, wherein said second layer is in intimate contact with said restraining layer.

8. A device according to claim 1, wherein the material of both said first and second layers is a synthetic material.

9. A device according to claim 1, wherein the material of said restraining layer is a synthetic material.

10. A device according to claim 1, wherein said first and second layers are made of the same material.

11. A device according to claim 1, wherein said restraining layer is made of a different material compared to the material of said first layer and said second layer.

12. A device according to claim 1, wherein said restraining layer is made of a woven material.

13. A device according to claim 1, the device being sufficiently flexible that it may be stored in a rolled-up state.

14. A method of diffusing a fluid into a surrounding medium, the method comprising placing a device according to claim 1 into said medium and introducing fluid into the device at a pressure such that the fluid is forced through the pores of the tubular member into the surrounding medium.

15. The use of a device according to claim 1 for diffusing a fluid into a surrounding medium.

* * * * *